United States Patent [19]

Huang

[11] Patent Number: 4,766,591
[45] Date of Patent: Aug. 23, 1988

[54] RANDOM MULTIPLE-ACCESS COMMUNICATION SYSTEM

[75] Inventor: Jian-Cheng Huang, Rochester, N.Y.

[73] Assignee: Eastman Kodak Company, Rochester, N.Y.

[21] Appl. No.: 25,234

[22] Filed: Mar. 12, 1987

[51] Int. Cl.[4] .................. H04Q 11/04; H04J 3/02; H04J 3/24
[52] U.S. Cl. ..................... 370/60; 370/85; 370/94
[58] Field of Search .......... 370/85, 110.1, 89, 88, 370/86, 94; 340/825.5, 825.51

[56] References Cited

U.S. PATENT DOCUMENTS

| | | | |
|---|---|---|---|
| 4,063,220 | 12/1977 | Metcalfe et al. | 340/147 LP |
| 4,636,584 | 1/1987 | Binkerd et al. | 370/110.1 |
| 4,706,246 | 11/1987 | Kume | 370/85 |

OTHER PUBLICATIONS

IEEE Trans. Inform. Theory, vol. It–31, No. 2, pp. 124–142, 3–85, pg. 1 line 31 entitled "A Perspective on Multiaccess Channels".

U.S. Patent application Ser. No. 770,478 entitled "Packet Switched Local Network with Priority Random Splitting & Conflict Detection" pg. 2 line 25 of the spec.

*Primary Examiner*—Douglas W. Olms
*Assistant Examiner*—Frank M. Scutch III
*Attorney, Agent, or Firm*—Thomas H. Close

[57] ABSTRACT

A random multiple-access communication system operates both a feedback-ignored (e.g. ETHERNET) and a feedback-utilized (e.g. STACK) protocol simultaneously. The system is useful for communicating two types of information such as voice and data wherein one of the information types (e.g. voice) is subject to delay constraints. The feedback-utilized protocol has the effect of taking priority over the feedback-ignored protocol in the communication system to provide a priority transmission system.

16 Claims, 8 Drawing Sheets

RANDOM MULTIPLE-ACCESS COMMUNICATION SYSTEM

TECHNICAL FIELD

The present invention relates to random multiple-access communication systems, and more particularly to protocols for resolving channel access disputes in such communication systems and apparatus for implementing the protocols.

BACKGROUND ART

In a random multiple-access communication system, the access operation of channel users is governed by a common discipline called a protocol. The system performance strongly depends on the protocol that the system employs.

Any random access protocol is a contention resolution algorithm. From the viewpoint of information theory, random access protocols can be classified into two categories, the feedback-ignored (FBI) protocols and the feedback-utilized (FBU) protocols. In general, a user who is involved in a collision determines his retransmission moment according to an access protocol. "Feedback-ignored" means that the user's decision on retransmission is independent of the channel activities after the collision. Examples of the FBI protocols are ALOHA, CSMA, CSMA/CD and their derivatives. On the other hand, "feedback-utilized" means that the retransmission decision of a collided packet is dependent on the channel activities after the collision. Examples of the FBU protocols are various types of random splitting protocols, such as the "tree," the "0.487," and the STACK protocols (see G. Gallager, "A perspective on multiaccess channels", IEEE Trans. Inform. Theory, Vol. IT-31, No. 2, pp. 124–142, March 1985).

Protocol performance differs in maximum throughput, delay property and stability. theoretically, FBU protocols can provide better performance than FBI protocols under the same conditions. It has been found that for an infinite population model, all FBI protocols are inherently unstable whereas most of the FBU protocols are stable. However, FBI protocols are relatively simple, well established and widely used. The existing commercial systems using FBI protocols, such as ETHERNET developed by Xerox Corporation (see U.S. Pat. No. 4,063,220 issued Dec. 13, 1977 to Metcalf et al), have met the basic needs of data communication and dominated the market. In contrast, FBU protocols are still in their infancy in practice. The advantages of FBU protocols are not convincing enough to persuade system engineers, who are more concerned for practical details such as standards, compatibility, connectivity, complexity, etc., to use them. Once a system is well-established, other systems, even those offering better performance, have difficulty replacing it.

The need has also arisen for transmitting two types of information such as voice and data, wherein one type of information (e.g. voice) is subject to a delay constraint and therefore has priority over the transmission of the other type of information (e.g. data). See U.S. patent application Ser. No. 770,478 entitled "Packet Switched Local Network with Priority Random Splitting and Conflict Detection" by J. C. Huang and C. L. Yeh filed Aug. 29, 1985.

It is therefore an object of the present invention to improve the performance of existing random multiple access communication systems employing FBI protocols such as ETHERNET, without necessarily replacing existing hardware in such systems. It is a further object of the invention to provide a random multiple-access communication system capable of communicating two types of information such as voice and data, wherein one type of information (e.g. voice) is subject to delay constraints and therefore must possess priority over the other type of information (e.g. data).

SUMMARY OF THE INVENTION

The above noted objects are achieved according to the present invention by performing multiple protocols in a common network. Surprisingly, it has been found that when a group of channel users employing an FBU protocol is added to a group of users performing an FBI protocol in a common network, the performance of the communication system for the FBI protocol users is only slightly affected, but the performance of the communication system for the FBU users is actually enhanced over the case in which all the users are FBU protocol users. The interaction of the two groups of users has the effect of giving priority to the FBU protocol users, and enhancing the overall performance of the network.

Thus, according to the present invention, a random multiple-access communication system includes a communication channel and a plurality of communication terminals for transmitting and receiving information over the communication channel. The plurality of terminals include a first group of terminals having means for implementing a feedback-ignored protocol for resolving channel access disputes and a second group of terminals having means for implementing a feedback-utilized protocol for resolving channel access disputes. In a preferred embodiment of the invention, the feedback-ignored protocol is an ETHERNET protocol and the feedback-utilized protocol is a STACK protocol.

A communication terminal according to the present invention for use in a random multiple-access communication system comprises a transceiver for transmitting and receiving information, a work station for generating and using the information, and a communication's controller connected between the workstation and the transceiver for controlling the passage of information therebetween. The communication controller includes means for implementing the feedback-ignored communication protocol when passing a first type of information to the transceiver and means for implementing a feedback-utilized communication protocol when passing a second type of information to the transceiver. In a preferred embodiment of the invention, the communication controller implements an ETHERNET protocol or a STACK protocol in response to a protocol select signal from the workstation.

MODES OF CARRYING OUT THE INVENTION

SYSTEM DESCRIPTION

Figure 1:
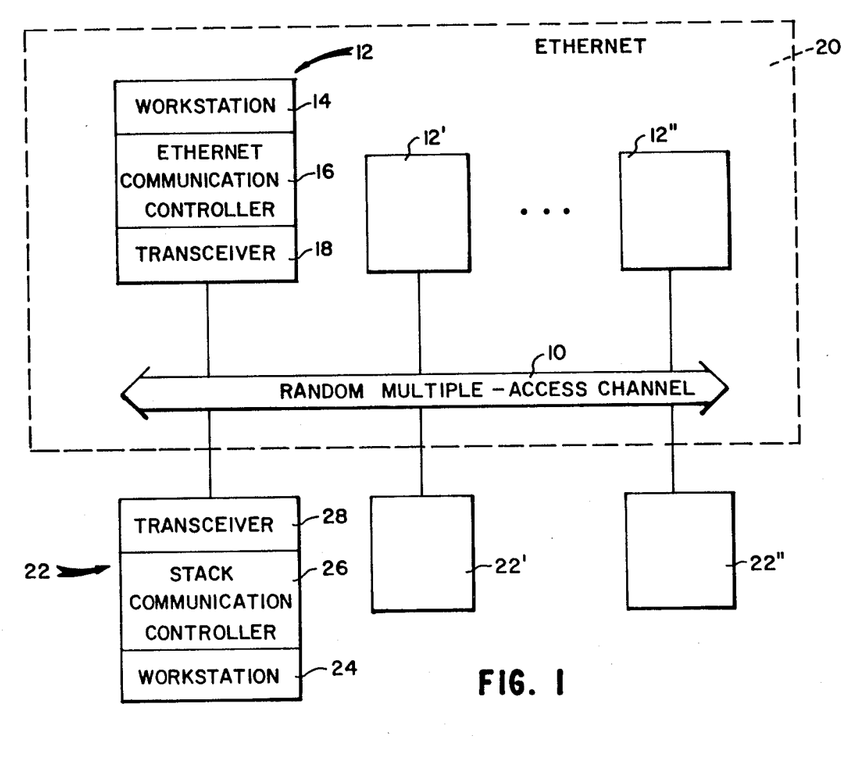
FIG. 1 is a schematic diagram of a communication system according to the present invention.

As shown in FIG. 1, a communication system according to the present invention includes a random multiple-access channel 10 such as an ETHERNET cable, and two group of users. The first group of users, represented by terminals 12, 12' and 12", operate according to a feedback-ignored protocol such as a CSMA/CD protocol. Each user terminal 12, 12' or 12" includes a workstation 14, a, ETHERNET controller 16, and a transceiver 18. This arrangement (as outlined in phantom 20) of user terminals operating according to a CSMA/CD protocol connected to a random multiple-access channel may comprise for example a standard ETHERNET installation Also connected to the random multiple-access channel 10 is a group of user terminals 22, 22' and 22" operating according to a feedback-utilized protocol, such as a STACK protocol. Each of the user terminals 22, 22' and 22" includes a workstation 24, a STACK controller 26 and a transceiver 28.

The CSMA/CD protocol is well known in the art, and is described as follows. Consider a number of spatially isolated, independent user terminals (12, 12' and 12") attempting to access the common communication channel 10. Messages from the workstation 14 are generated independently at random moments and packetized at the user terminals. For convenience, the transmission time of one packet is normalized to 1 unit time.

The system is assumed to work in a local environment that features relatively short propagation delay when compared with the unit time and allows users to apply the carrier sense (CS) and the conflict detection (CD) techniques. Typically, the channel time is partitioned into segments of fixed length, called minislots, which equal the maximum end-to-end propagation delay in the system. Assuming that carrier sense and conflict detection techniques are applied to all users, any user can be certain of the occurrence of a conflicting transmission. Practically, for a reliable operation, the active user may add jamming bits after he detects a collision. Therefore, three basic channel activities can be observed, i.e. the successful transmission whose length is 1 unit, the collision fragment whose length is variable depending on the spacing of the active users, and the empty slot whose length is 1 minislot.

According to the ETHERNET version CSMA/CD protocol, a user with a packet ready for transmission first senses the channel.

1. If the channel is sensed idle, then the protocol initiates the transmission of the packet.

2. If the channel is sensed busy, then wait until the completion of the ongoing activity and transmit.

3. If a collision is detected during the transmission, then abort the transmission and schedule the retransmission for the packet according to a backoff algorithm.

According to the IEEE 802 specification which describes ETHERNET, a collided packet defers its $k^{th}$ retransmission (or "retry") by $\delta^{(k)}$, where $\delta^{(k)}$ is a random variable uniformly distributed over the descrete set $\{0, a, \ldots, (2^{min[k,10]}-1)a\}$, where a is the length of a minislot. this is referred to as the truncated binary exponential backoff algorithm.

The STACK protocol is a type of feedback-utilized conflict resolution algorithm. The basic STACK protocol was proposed for a slotted channel whose slot length equals the packet length (see S. Tsybakov and N. D. Uvedenskaya, "Random multiple-access stack algorithms", Probl. Peredachi Inf., Vol. 16, No. 3, pp. 80–94, July–Sept. 1980).

In the following description, the STACK protocol is applied to a local environment such as an ETHERNET and combined with the carrier sense and the collision detection techniques. This enhanced version of the STACK protocol for a local network is diagramed in FIG. 2 and can be described as follows. According to the STACK protocol, each user holds a counter I by which he decides the moments for retransmissions. A user with a packet ready for transmission sets his counter value to I=0, and then performs the following steps.

Figure 2:
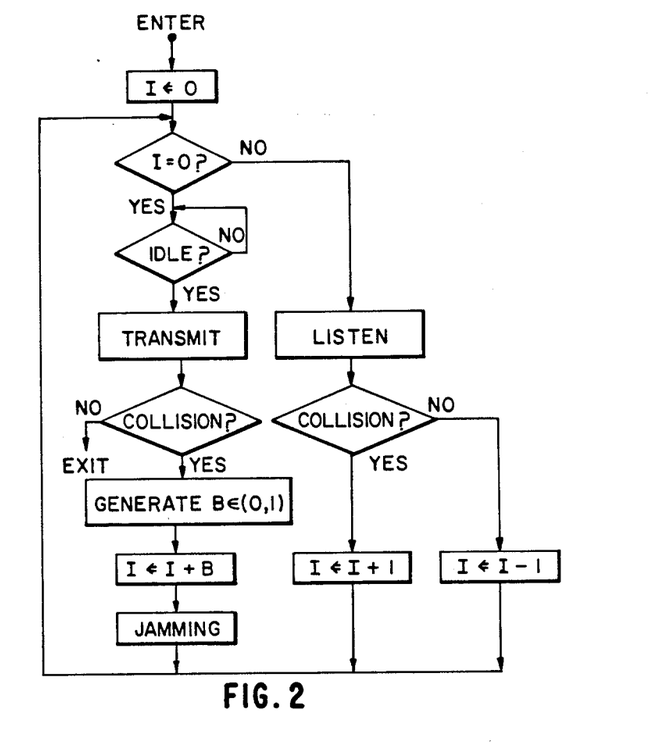
FIG. 2 is a flow chart useful in describing a STACK protocol.

1. Check counter I. If I=0, then go to step 2. Otherwise, go to step 3.

2. If the channel is sensed busy, then hold the packet until an idle period is sensed. If the channel is sensed idle, initiate the packet transmission. If the transmission is successful, leave the system. If a collision is detected during the transmission, then abort the transmission, increment counter I by one with probability 0.5 (generate $B\gamma\{0,1\}$), and return to step 1.

3. Monitor the channel. At the end of each channel activity, update the I value, increment I by one if the previous activity was a collision, decrement I by one if otherwise. Return to step 1.

The STACK protocol is a high performance protocol, but due to the problems noted above with respect to the difficulty of gaining commercial acceptance of a new communication's protocol, it has received few applications in a real system to date.

Although the evaluation of the performance of a "pure" ETHERNET communication system or a mixed ETHERNET/STACK communication system is presently beyond the grasp of mathematical analysis, the inventor has evaluated the performance of such systems by simulating them on a computer as follows.

It was assumed that each user has an infinite buffer connected to an independent source. the packet arrivals to a user buffer form a Poisson process. For simplicity, the arrival rate and the packet size of each user are assumed to be the same for all, and the overall arrival rate in the system, $\lambda$, is given as a variable. In the simulation program, most of the ETHERNET details, such as packet size, buffer size, interpacket spacing, collision jamming, size of minislot, etc., were considered. Throughout the simulations to be described, a transmission rate of 10 Mbps, a maximum transmission range of 3 km, a packet size of 256 bytes, a jamming sequence of 4 bytes and an interpacket spacing of 9.6 $\mu$s was assumed. The total number of test packets in a simulation was 50,000. the average packet delay, the maximum queue length, and the maximum size of the backlog set are observed for every given arrival rate $\lambda$. The simulation results were as follows.

1. Single-protocol cases

Two single-protocol cases, i.e. the "pure" ETHERNET and the "pure" STACK protocol running in a local environment, were examined. A population size of 100 terminals was assumed for each case.

Figure 3:
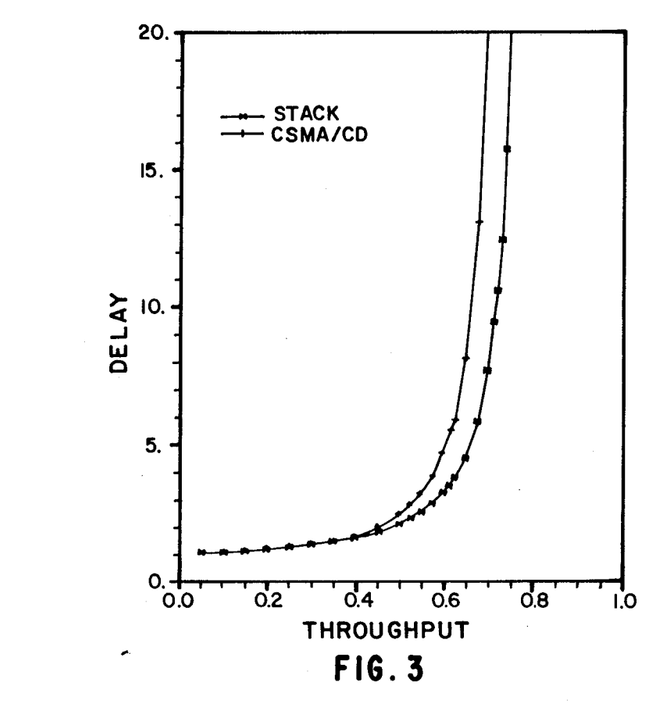
FIG. 3 is a graph of throuphput vs. average delay for a pure ETHERNET and a pure STACK protocol network (by simulation)
Figure 4:
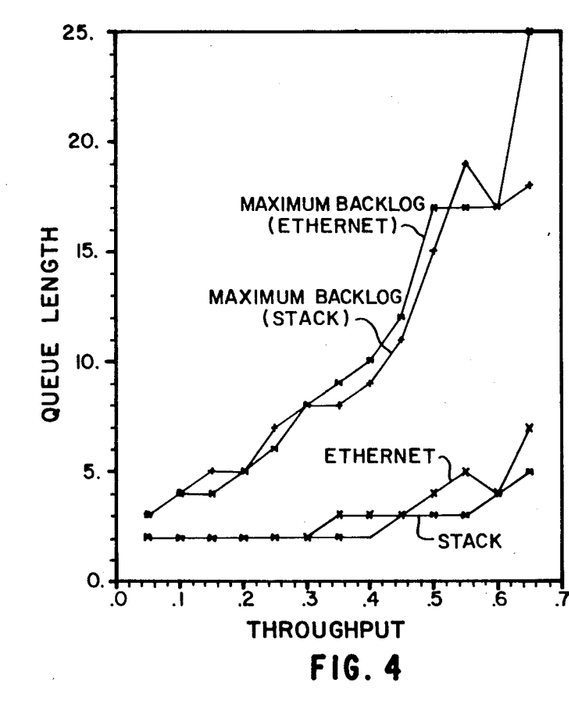
FIG. 4 is a graph of throughput vs. maximum queue length for a pure ETHERNET and a pure STACK protocol network (by simulation)

FIG. 3 and FIG. 4 show the result of the average packet delay characteristics, the maximum queue lengths, and the maximum channel backlogs for these two cases. The numerical results verify that the stack protocol has shorter delay, shorter maximum queue length, and less backlog size than the "pure" ETHERNET in heavy traffic.

2. Two protocol case

Figure 5:
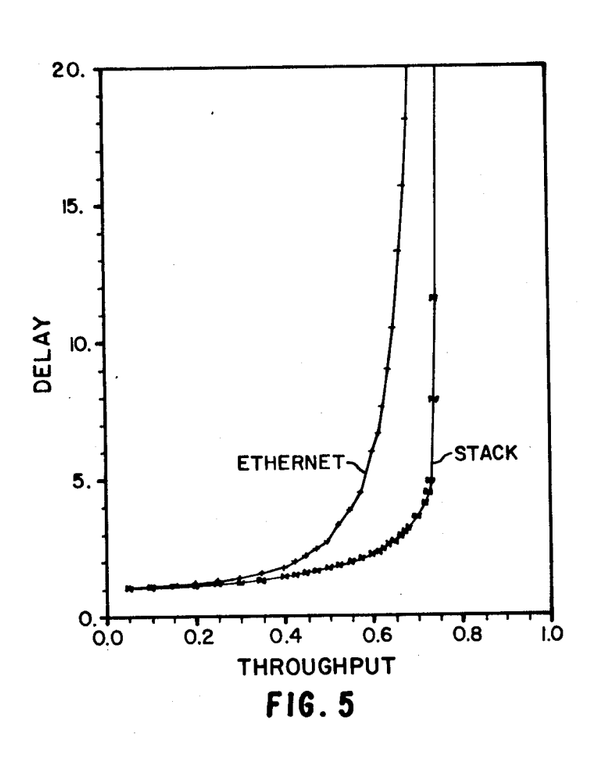
FIG. 5 is a graph of throughput vs. average delay for ETHERNET users and STACK users in a mixed protocol communication system according to the present invention.
Figure 6:
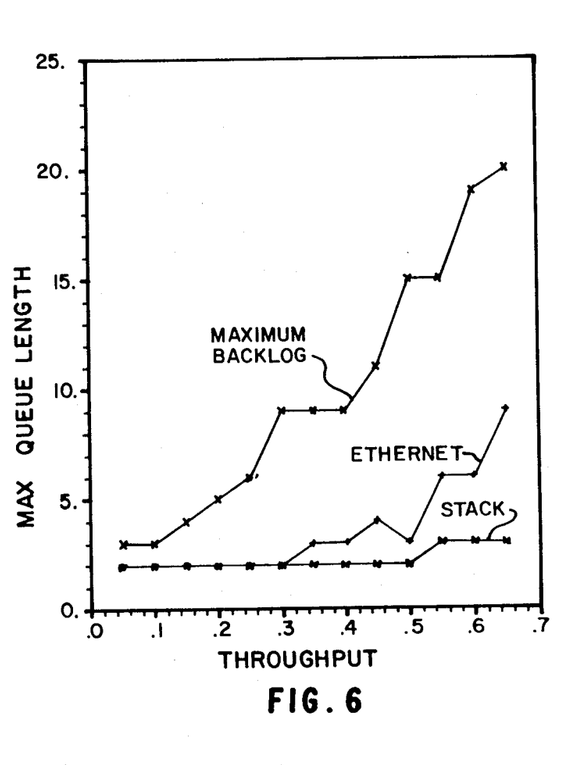
FIG. 6 is a graph of throughput vs. maximum queue length for ETHERNET users and STACK users in a mixed protocol communication system according to the present invention.

The user population was partitioned into two groups of equal size (50). Two different protocols were operated in parallel in a common network, Group 1 employing the STACK protocol while Group 2 employing the standard ETHERNET protocol. Individually, a user executed one of the two protocols assuming that all the other users in the system execute the same as his own. The properties of two user groups in a common system are shown in FIG. 5 and FIG. 6. FIG. 5 shows the average delay vs. throughput for ETHERNET and STACK users in the two protocol system, and FIG. 6 shows the maximum queue length vs. throughput for ETHERNET and STACK users, and the maximum backlog vs. throughput for the system as a whole.

The simulation results showed that the performance of a two-protocol system is biased to one user group (the STACK users). Similar to FIG. 3, the STACK protocol group has much shorter average delay than the standard ETHERNET group.

Comparing FIGS. 3 and 5, it can be seen that the two-protocol scheme can be employed to prioritize a mixed traffic. That is, by assigning one type of information (e.g. voice) to be transmitted according to a feedback-utilized protocol (e.g. STACK), and another type of information (e.g. data) to be transmitted according to a feedback-ignored protocol (e.g. ETHERNET), the transmission of the one type of information is given priority over the transmission of the other.

It is also seen from the simulation results that when the STACK protocol is incorporated with the standard ETHERNET, it exhibits shorter delay than when it (STACK) runs alone. The group of users employing the STACK protocol get priority at the expense of slightly longer delay for the group of users employing the standard ETHERNET protocol. This priority scheme can be used to provide new service on an existing network without changing the structure or seriously degrading the performance of the existing network. It was very surprising to find that, even at the pole of the ETHERNET's rate-delay characteristic, the STACK protocol group has a low average delay (less than 4 units).

APPLICATION TO VOICE/DATA INTEGRATION

The simulation results noted above suggest that the two-protocol scheme could be beneficial to voice/data integration on an ETHERNET, in which a rigorous voice delay constraint is required. The implementation of voice/data integration by means of a two-protocol scheme was investigated as follows. Users were classified into two categories, i.e. voice and data, which are governed by the STACK protocol and the ETHERNET version of CSMA/CD protocol, respectively.

Figure 7:
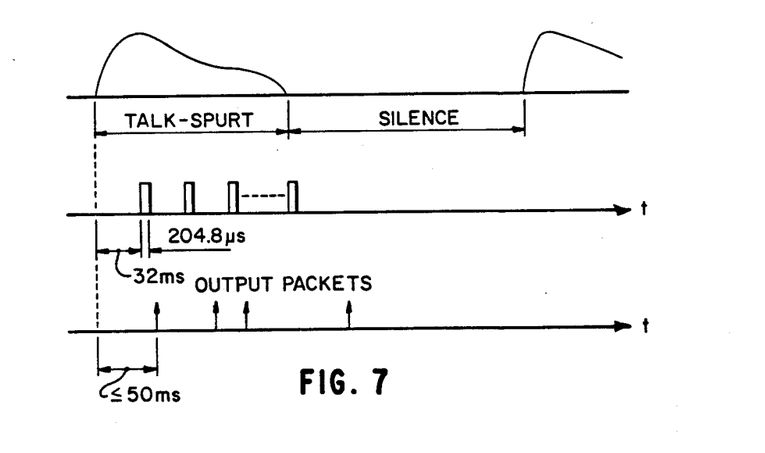
FIG. 7 is a timing diagram useful in describing a model of voice communication in a random multiple-access system.

Two interactive voice users constitute a voice channel or a conversation. A conversation was modeled as a sequence of talk-spurts, as shown in FIG. 7. the length of a talk-spurt and the length of a silent period between talk-spurts were exponentially distributed with means of 1.34 s and 1.67 s, respectively. The talk-spurts were digitized at a rate of 64 kbps, packetized into voice packets with a size of 256 bytes, and transmitted over the random multiple-access channel at the rate of 10 Mbps using the STACK protocol. In other words, during the period of a talk-spurt, a speech source generates a sequence of equally separated packets with lengths of 204.8 $\mu$s, and interpacket separations of 32 ms. Accordingly, the equivalent channel utilization of a conversation in ETHERNET is 0.00285.

The stimulation system included 150 active voice conversations employing the STACK protocol and 150 data transmitting terminals employing the ETHERNET protocol. The superposition of the 150 conversations yielded a voice throughput of 0.427. It was assumed that data transmitting terminals had equal data arrival rates and the overall data throughput was given as a variable. The data packet arrivals at a data receiving terminal were modeled as a Poisson point process. Parameter configurations were the same as in the previously described simulation except for the buffer size and the lifetime of voice packets.

The delay constraint of a talk-spurt was set to be 50 ms. The packetized delay of 32 ms was subtracted from the total delay constraint as shown in FIG. 7. The resulting net voice packet delay constraint or the lifetime was 18 ms. The buffer size of a data transmitting terminal was assumed to be 4 k bytes which can hold up to 16 data packets. The size of the voice buffer in the voice transmitting terminals was chosen such that it held only one voice packet, because the net voice packet lifetime was less than the interpacket separation and, hence, the maximum queue length would not be greater than 1.

Figure 8:
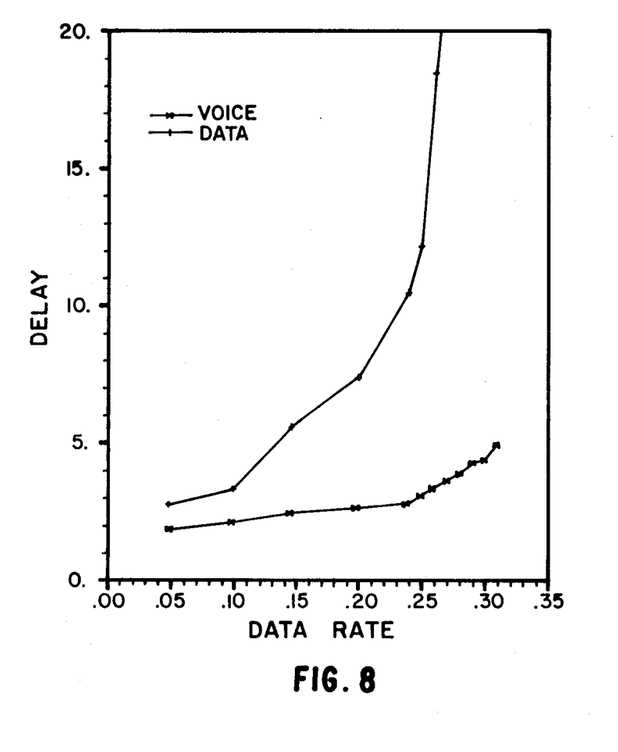
FIG. 8 is a graph showing data rate vs. average delay for voice and data packets in a mixed protocol random multiple-access communication system according to the present invention.
Figure 9:
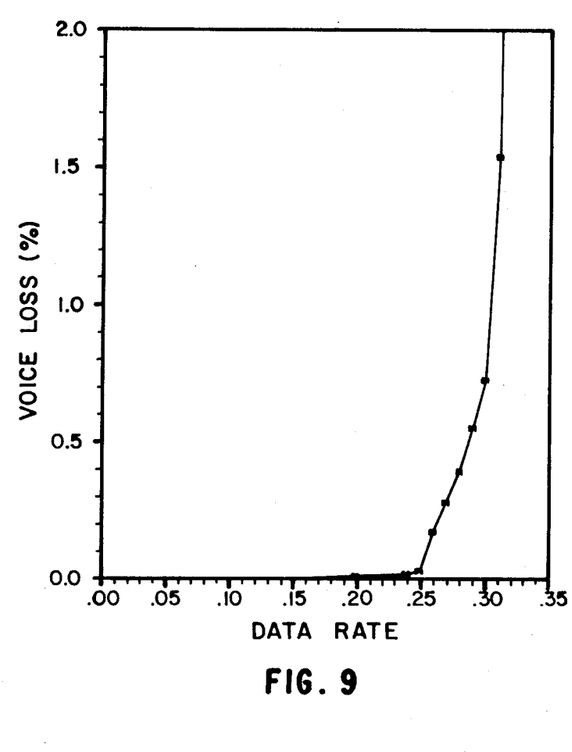
FIG. 9 is a graph showing data rate vs. percent voice loss in a mixed protocol random multiple-access communication system according to the present invention.

The delay properties of both the data and voice transmitting groups and the packet loss rate of the voice group were examined for data transmission rates from 0.05 to 0.3. the results of the simulation, as shown in FIGS. 8 and 9, indicate that when the data rate was less than 0.25, the loss of voice packets was lower than 0.04% and the data packet delay is at an affordable level (not greater than 10 units). As shown in FIG. 9, the voice packet loss increased rapidly when the data rate was greater than 0.25 and reached an unacceptable level of 1% at a data rate of approximately 0.3.

The results of these simulation studies indicated that a mixture of the STACK protocol and the standard ETHERNET protocol on a shared communication channel would provide a communication system capable of handling both voice and data with high performance.

Such a multiple protocol communication system has the advantage that it can be implemented simply and economically by adding STACK protocol terminals to a standard ETHERNET, thereby overcoming the problems and expenses involved in implementing a new protocol.

COMMUNICATIONS TERMINAL

A communications terminal for transmitting voice and data in a random multiple-access communication system using STACK and ETHERNET protocols according to a presently preferred mode of practicing the present invention will now be described with reference to FIGS. 10–13.

Figure 10:
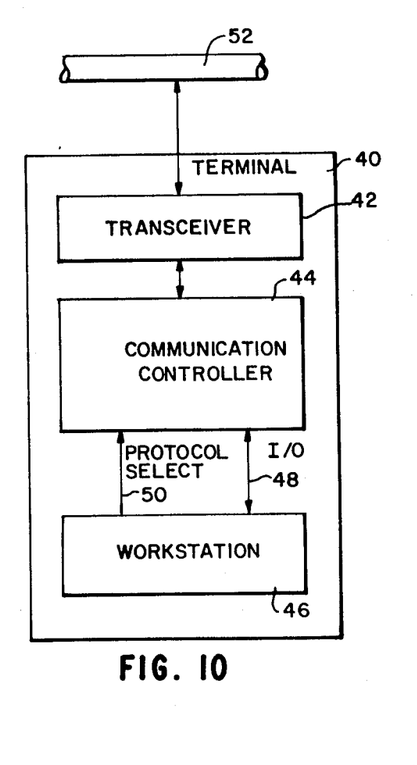
FIG. 10 is a block diagram of a communication terminal for implementing multiple communications protocols.

FIG. 10 is a schematic diagram of the communication terminal 40 which includes a transceiver 42, a communication controller board 44, and a workstation 46. The communication controller board 44 receives information from the workstation 46 on an I/O line 48, and a signal from the workstation 46 indicating the type of information (e.g. data or voice) on a protocol select line 50. The communication controller board 44 implements the STACK protocol for voice transmission and the ETHERNET protocol for data, and supplies the information for transmission to the transceiver 42. The transceiver receives and transmits information on an ETHERNET cable 52. The transceiver 42 is a standard ETHERNET transceiver. The communication controller 44 is a standard ETHERNET controller board modified as follows.

Figure 11:
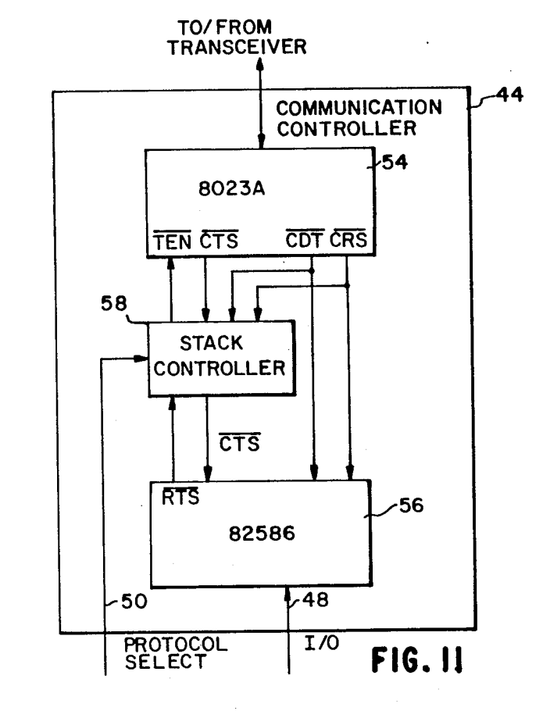
FIG. 11 is a block diagram of a modified CSMA/CD protocol controller board, for performing either a CSMA/CD or STACK protocol.

The communication controller board 44 is shown in FIG. 11. The communication controller board 44 is a modified Intel ETHERNET interface iSBC 186/51. The main components of the modified controller board are an ETHERNET serial interface chip 8023A (54), a LAN (local area network) coprocessor chip 82586 (56) and a STACK controller circuit 58, which was added to the standard controller board by the inventor.

The serial interface chip 8023A and the LAN coprocessor chip 82586 are designed to work together in 10 Mbps LAN applications. The primary function of the 8023A chip (54) is to perform Manchester encoding/decoding, provide 10 Mbps transmit and receive clocks to the 82586 chip (56), and to drive the transceiver (42). The 82586 chip (56) is an intelligent peripheral that completely manages the processes of transmitting and receiving packets over a network. The 82586 chip (56) offloads the workstation (46) of the tasks related to managing communication activities. Between the 8023A chip (54) and the 82586 chip (56) there are four handshaking connections providing the channel feedbacks and controlling the transmission activities. When a packet is sent from the workstation, the 82586 communication chip checks the status of a Carrier-Sense ($\overline{CRS}$) signal from the 8023A interface chip (54). If $\overline{CRS}$ is active, then the 82586 chip 56 activates a Request-to-Send ($\overline{RTS}$) signal and hence the Transmit-Enable ($\overline{TEN}$) input of the 8023A chip (54). When the transmission conditions are met the 8023A chip (54) sends back to the 82586 chip (56) a Clear-to-Send ($\overline{CTS}$) signal to confirm the transmission. If a collision is detected during the transmission, the 8023A chip (54) generates a Collision-Detect ($\overline{CDT}$) signal. Upon the reception of a $\overline{CDT}$ signal the 82586 chip (56) interrupts the packet transmission and starts sending a sequence of symbols called jamming. After the jamming period the 82586 chip (56) inactivates the $\overline{RTS}$ signal. The $\overline{RTS}$ signal remains inactive until a random back-off period generated by the 82586 chip (56) is over. Once the $\overline{RTS}$ signal is reactivated the packet is retransmitted immediately.

The main difference between the STACK protocol and the ETHERNET protocol is the back-off scheme by which the user involved in a collision determines the retransmission time. From the above description $\overline{TEN}$ and $\overline{CTS}$ are directly related to the transmission or retransmission activities. To implement the STACK protocol based on ETHERNET hardware, a change is made in the retransmission control mechanism such that upon the reception of $\overline{CDT}$ signal, the $\overline{TEN}$ signal is determined by an external logic circuit (the STACK controller circuit 58). The stack controller circuit (58) will now be described with reference to FIGS. 12 and 13.

Figure 12:
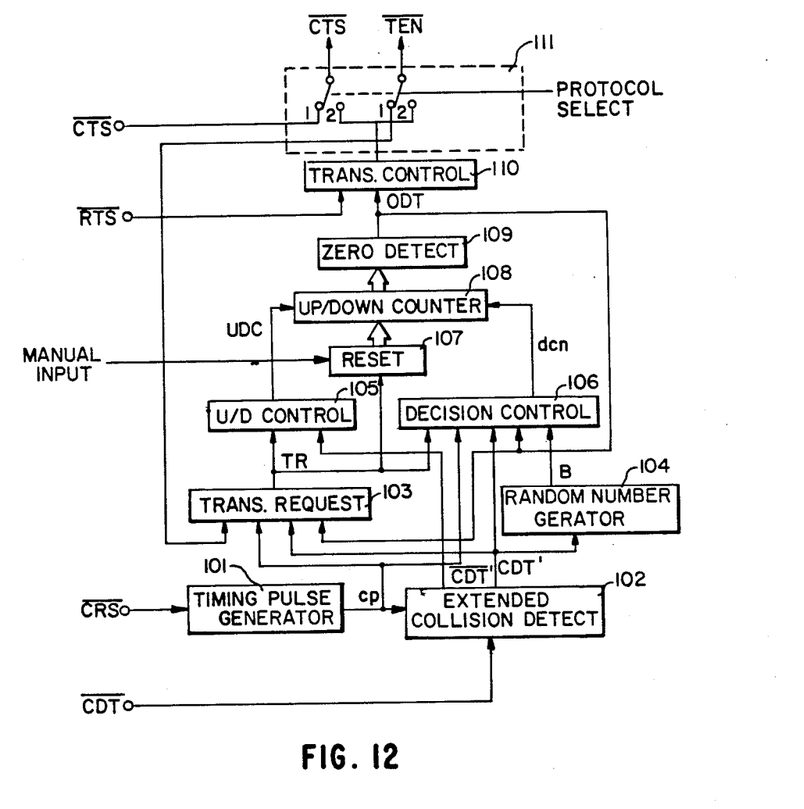
FIG. 12 is a hardware flow chart for the STACK protocol controller shown in FIG. 11.

Referring first to FIG. 12, the functional blocks of the STACK controller circuit are shown. A timing pulse generator 101 receives the $\overline{CRS}$ signal and generates a sequence of equally spaced timing pulses (cp) having a width of 0.35 μs. The sequence of timing pulses (cp) continues until the $\overline{CRS}$ signal becomes active, at which time the sequence terminates. The sequence of timing pulses (cp) are supplied to an extended collision detection circuit 102 which also receives the $\overline{CDT}$ signal and generates 5 an extended collision detection signal CDT'. The collision detection signal $\overline{CDT}$ is extended such that a rising edge of the output coincides with the inactive edge of the $\overline{CRS}$ signal. The extended collision detection signal is supplied to a transmission request circuit 103, a random number generator 104, and a decision control circuit 106. The inverse of the CDT' signal $\overline{CDT'}$ is supplied to an up/down control circuit 105.

The transmission request circuit 103 also receives the $\overline{RTS}$ signal, the timing pulse trains (cp) from the timing pulse generator 101, and a zero detected control signal ODT (generated as described below), and generates a transmission request signal TR that is supplied to the up/down control circuit 105, the decision control circuit 106, and a reset logic circuit 107. The random number generator 104 generates a binary uniformly distributed pseudo-random number (B) in response to triggering by the extended collision detection signal CDT'. The up/down control circuit 105 receives the transmission request level signal TR and the inverse of the extended collision detection signal $\overline{CDT'}$ and generates an up/down control signal UDC that is supplied to an up/down counter 108. The UDC signal tells the up/down counter whether to count up or down in response to a decision pulse dcn.

The decision control circuit 106 receives the transmission request signal TR, the timing pulse train (cp), the extended collision detection signal CDT', the control signal ODT, and the random number B, and generates the decision pulse dcn at the end of each channel activity. The decision pulse dcn is supplied as a clock signal to the up/down counter 108.

Reset logic 107 receives the transmission request signal TR or a manual input (for initiation) and generates a reset signal that is applied to up/down counter 108 to set the counter to zero. The up/down counter counts the decision control pulses dcn either up or down, depending upon the status of the up/down control circuit UDC, and supplies the count to a zero detect circuit 109.

The zero detect circuit 109 monitors the count from the up/down counter 108 and generates a zero detect control signal ODT when the count reaches zero.

The zero detect control signal ODT is supplied to transmission control logic 110. The transmission control logic 110 gates the $\overline{\text{RTS}}$ signal to one of the terminals of a protocol selection switch 111, upon receipt of the zero detect control signal ODT.

The protocol selection switch 111 selects the ETHERNET protocol in a first position or the STACK protocol in a second position in response to a protocol select signal from the workstation. The protocol select switch is a ganged pair of single-pole double throw switches that in the first position directly connect to the $\overline{\text{CTS}}$ signal from the 8023A chip to the 82586 chip, and the $\overline{\text{RTS}}$ signal from the 82586 chip to the $\overline{\text{TEN}}$ input of the 8023A chip (see FIG. 11). In the second position, the output from the transmission control logic is supplied to both the $\overline{\text{CTS}}$ input of the 82586 chip, and the $\overline{\text{TEN}}$ input of the 8023A chip.

Figure 13:
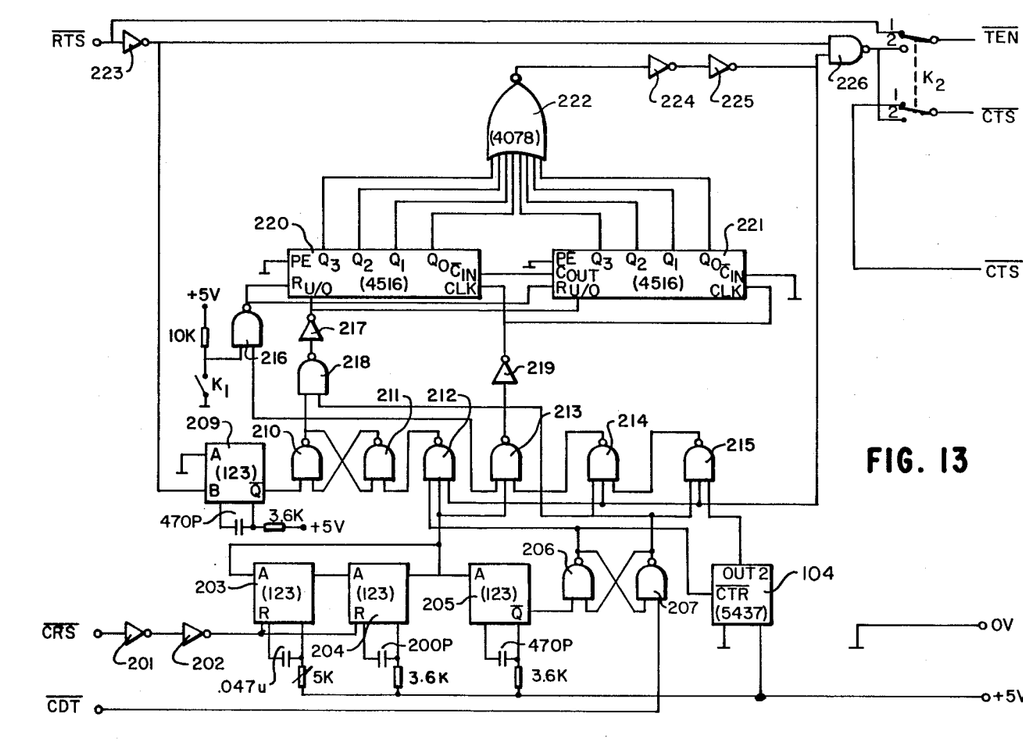
FIG. 13 is a circuit diagram for the STACK protocol controller shown in FIG. 11.

The block diagram of FIG. 12 is implemented in hardware as shown in FIG. 13. The timing pulse generator 101 comprises inverters 201 and 202, and monostable triggers 203 and 204. The extended collision detection circuit 102 comprises a monostable trigger 205 and NAND gates 206 and 207. The transmission request circuit comprises a monostable trigger 209, and NAND gates 210, 211 and 212. The random number generator is a National Semiconsuctor Corporation random number generator chip MM 5437 (104).

The up/down count control circuit 105 comprises an inverter 217 and a NAND gate 218. The decision control circuit 106 comprises NAND gates 213, 214 and 215 and an inverter 219.

The reset logic 107 comprises a NAND gate 216. A switch K1 is shown for manual testing of the circuit. The up/down counter 108 comprises a pair of Motorola Corporation counters chips MC1-4516 (220 and 221) connected as shown in FIG. 13. The zero detection circuit 109 comprises a NOR gate 222, and inverters 224 and 225.

The transmission control circuit 110 comprises inverter 223 and a NAND gate 226. The protocol selection switch comprises the ganged single-pole double thrown switch K2. Multiple protocol terminals as described above can be inverted into a standard ETHERNET as needed for communicating both voice and data. Of course, terminals operating under only the STACK protocol can also be inserted into a standard ETHERNET to upgrade the performance of the network.

INDUSTRIAL APPLICABILITY AND ADVANTAGES

The present invention is useful in random multiple-access communication systems. The invention has the advantages of upgrading the performance of an existing communications network without changing any of the existing equipment or protocols on the network, by merely adding additional terminals operating under a different protocol. The invention has the additional advantage of providing a communication system that can be used to prioritize the transmission of different types of information, such that the transmission of one type takes precedence over the transmission of another type.

I claim:

1. A random multiple-access communication system, comprising:

a communication channel; and a plurality of communication terminals for transmitting and receiving information over said communication channel, said plurality including a first group of terminals having means for implementing a packet-switching feedback-ignored protocol for resolving channel access disputes, and a second group of terminals having means for implementing a packet-switching, random splitting, feedback-utilized protocol for resolving channel access disputes, said protocols interacting to resolve channel access disputes in such a manner that after a collision, every transmitting terminal ceases transmission and initiates retransmission according to its own protocol.

2. The communication system claimed in claim 1, wherein said first group of terminals transmits and receives a first type of information and said second group of terminals transmits and receives a second type of information having priority over said first type.

3. The communication system claimed in claim 2, wherein said plurality further includes a communication terminal for transmitting and receiving said first and second types of information and including means for selectively implementing said feedback-ignored protocol when transmitting said first type of information and said random-splitting feedback-utilized protocol when transmitting said second type of information.

4. The communication system claimed in claim 1, wherein said feedback-ignored protocol is a CSMA/CD protocol, and said random-splitting feedback-utilized protocol is a STACK protocol.

5. The communication system claimed in claims 2 or 3, wherein said first type of information is data, and said second type of information is voice.

6. A communication terminal for use in a random multiple-access communication system, comprising:

a transceiver for transmitting and receiving information, a workstation for generating and using information, and a communications controller connected between said workstation and said transceiver for controlling the passage of information therebetween, said communications controller including, means for implementing a packet-switching feedback-ignored communication protocol when passing a first type of information to said transceiver; and means for implementing a packet-switching, random-splitting feedback-utilized communication protocol when passing a second type of information to said transceiver both of said protocol implementing means being adapted to cease transmission after a collision, and initiate retransmission according to its respective protocol.

7. The communications terminal claimed in claim 6, wherein said feedback-ignored protocol is a CSMA/CD protocol, and said random-splitting feedback-utilized protocol is a STACK protocol.

8. The communications terminal claimed in claims 6 or 7, wherein said first type of information is data, and said second type of information is voice.

9. A method of operating a random multiple-access communication system, comprising the steps of:

transmitting a first type of information over a communication channel using a packet-switching feedback-ignored protocol for resolving channel access disputes; and transmitting a second type of information over said communication channel using a packet-switching, random-splitting feedback-utilized protocol for resolving channel access disputes said protocols interacting to resolve channel access disputes in such a manner that after a collision, transmission of both types of information is halted, and transmission is reinitiated according to the respective protocols.

10. The method claimed in claim 9, wherein said feedback-ignored protocol is a CSMA/CD protocol, and said random-splitting feedback-utilized protocol is a STACK protocol.

11. The method claimed in claims 9 or 10, wherein said first type of information is data, and said second type of information is voice.

12. A communication controller in a communication terminal for use in a random multiple-access communication system, comprising:

means for implementing a packet-switching feedback-ignored communication protocol in response to a signal representing a first type of information; and means for implementing a packet-switching, random-splitting feedback-utilized communication protocol in response to a signal representing a second type of information, both of said protocol implementing means being adapted to cease transmission after a collision, and initiate retransmission according to its respective protocol.

13. The communication controller claimed in claim 12, wherein said feedback-ignored communication protocol is an ETHERNET protocol.

14. The communication controller claimed in claim 13, wherein said means for implementing said ETHERNET protocol comprises an ETHERNET serial interface chip, and a LAN coprocessor chip, and said means for implementing said random-splitting feedback-utilized communication protocol comprises a random-splitting control circuit connected between said serial interface chip and said LAN coprocessor chip.

15. The communication controller claimed in claim 14, wherein said feedback-utilized communication protocol is a STACK protocol.

16. The communication controller claimed in claims 14 or 15, wherein said random-splitting control circuit includes means responsive to a protocol select signal for implementing said random-splitting feedback-utilized protocol or said feedback-ignored protocol.

* * * * *